United States Patent Office 3,047,719
Patented July 31, 1962

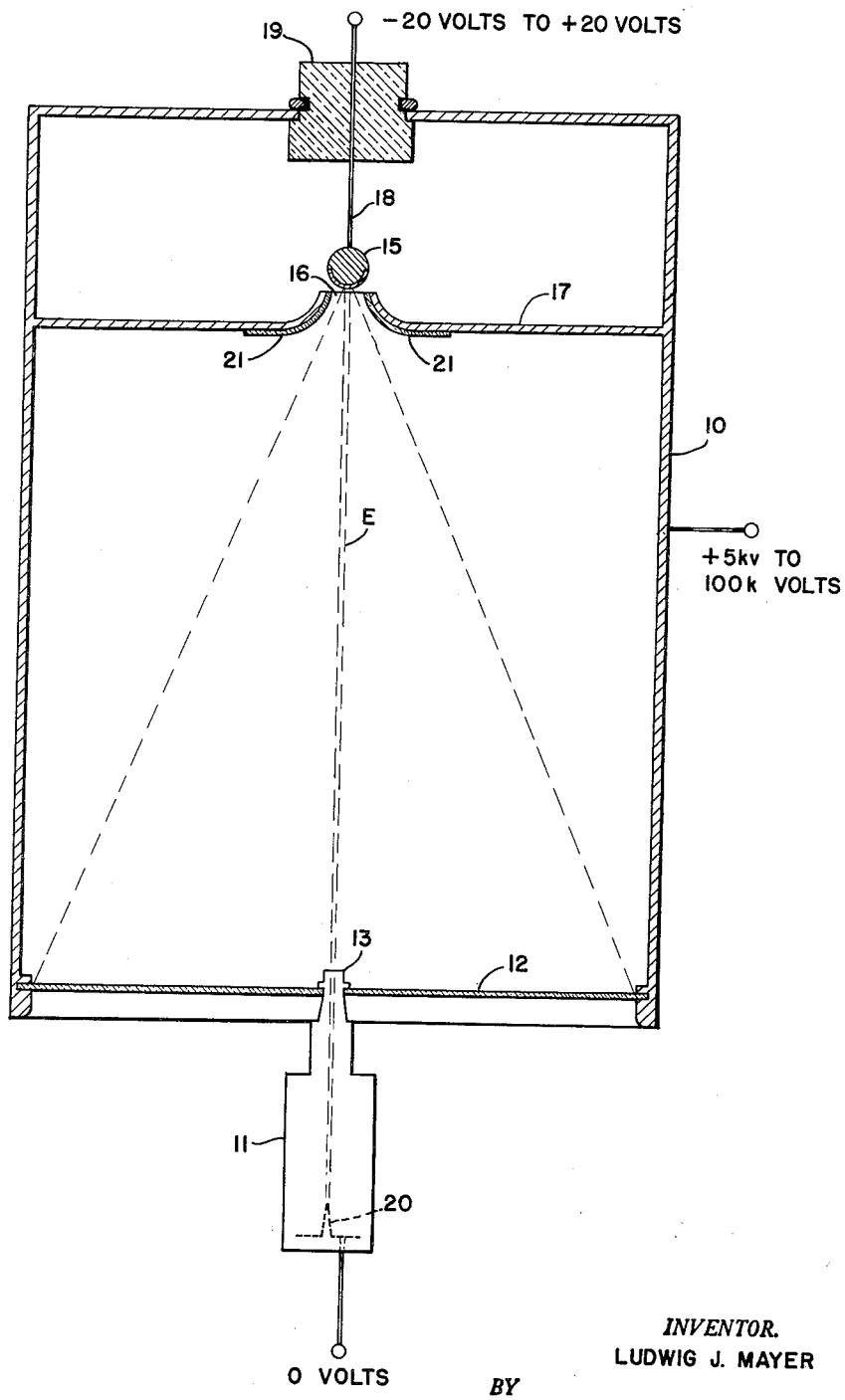

3,047,719
BALL MICROSCOPE
Ludwig J. Mayer, St. Paul, Minn., assignor to General Mills, Inc., a corporation of Delaware
Filed Sept. 16, 1959, Ser. No. 840,374
8 Claims. (Cl. 250—49.5)

This invention relates to electron mirror microscopy. This type of microscopy employs near the specimen slow-moving electrons and utilizes the microscopic specimen as an electron mirror. The normal component of actual electron velocity is slowed down to zero in front of the mirror-specimen although a radial component of velocity will generally continue to exist. Any irregularity in the equipotentials in front of the mirror acts like an inhomogeneity in the refractive index, the influence of such irregularity rapidly decreasing with increasing distance from the mirror. Thus the returning electron beam carries a kind of electron optical schlieren-picture of the potential distribution in front of the mirror-specimen.

This kind of electron mirror microscope utilizes an electron gun, such as a modified Steigerwald electron gun. The illuminating electron beam is shot through an opening in a viewing screen of suitable luminescent qualities. After passing through an electron optical system, the electron beam is reflected on the equipotentials in front of the specimen-mirror. The electron mirror has a slightly negative potential and therefore acts as an electron optical mirror. Every irregularity in the equipotentials in front of the mirror influences the low-velocity electron beam, whether caused by differences in contact potential, by differences in surface charge, by differences in conductivity, or simply by the geometrical relief on the mirror. The reflected electrons returning through the electron optics system project a magnified pictorial representation of the potential distribution of the specimen onto the viewing screen.

The voltages used in one such microscope range from 7 kv. to 35 kv., although greater potential ranges may be used, and the electrostatic lens of the optics system of that particular microscope was a combination of a cathode lens with an einzel-lens, i.e. a three electrode lens similar to that used for an emission type electrode microscope.

Although conventional mirror microscopes are convenient, as they do not require any deflecting magnetic fields, they have been limited in their magnification because the magnification must be accomplished in only one electron optical stage located close to the mirror object.

An important object of the present invention is to provide an electron mirror microscope which permits high magnification, which is simpler in form than those previously known, and which dispenses with the electron optic system previously necessary for magnification. In other words, neither electric nor magnetic lenses for magnification are required.

Another object of this invention is to provide an electron microscope which will operate on a single high voltage potential without need for intermediate voltages.

A still further object of the invention is to provide an electron mirror microscope which will considerably surpass the useful magnification of light microscopes, and which will reveal, in addition to the geometric profile of the specimen, the distribution of contact potentials, surface charges, conductivity distributions, and the like, in a simpler manner.

Still another object is to provide higher resolving power than conventional electron microscopes, that is, higher useful magnification because the ball mirror-specimen permits high field strength, i.e., magnitude of the electric or other potential gradient, at the specimen which is a requirement for high resolving power. The use of high field strengths is made possible because of the curved surface of the ball mirror, for the field strength is nowhere higher than at the place which is under observation. The relative smooth surface of the ball mirrors allows a higher field strength before field emission and breakdown (caused by surface roughness) starts.

The invention comprises an electron mirror microscope system employing an electron gun, a curved reflecting and magnifying mirror-specimen, and luminescent screen means for receiving the returning electrons which form the greatly enlarged image.

For a more complete description of the invention, reference is made to the drawing wherein the single FIGURE is a schematic plan view of an electron mirror microscope embodying the invention.

The elements shown comprise a housing 10, an electron gun 11, a luminescent viewing screen 12 having a central opening formed therein through which the end 13 of the gun 11 extends. Spaced from the viewing screen 12 and the electron gun 11 is a curved mirror surface 15, which, as illustrated, is a small ball. The ball is located concentrically near the aperture 16 in the wall member 17 and is supported at one end of a rod 18. The rod 18 extends through an insulating bushing 19, such as ceramic or the like. While such an arrangement permits the ball 15 to be moved in an axial direction, it will be appreciated that when angular movement of the mirror-specimen is desired a suitable universal joint might be employed.

From the usual tungsten filament hairpin cathode 20 in the electron gun 11 an illuminating electron beam E is shot through the viewing screen and out the end 13 of the gun 11 toward the ball 15 aligned with the aperture 16 and is reflected on the equipotentials in front of the ball mirror-specimen 15. The voltage of the ball 15 may be between —20 volts to +20 volts as indicated, but is, generally, negative with respect to the cathode of the electron gun, to the extent of a few tenths of a volt. Every irregularity of the potential surfaces in front of the mirror ball 15, whether resulting from differences in contact potential, surface charge, conductivity, or geometrical relief of the mirror, influences the low-velocity electron beam in front of the ball mirror and the returning electrons project a magnified pictorial representation of the potential distribution in front of the ball 15 onto the luminescent viewing screen 12.

The size of the mirror ball 15 in the drawing is not proportional to the other dimensions, for in practice the diameter of the ball is $10^2$ to $10^4$ times smaller than the distance between the ball and the screen 12. The ball to screen distance may be between about 50 cm. and about 150 cm.

The physical smoothness of surface and the uniformity of curvature of the mirror surface are of importance in obtaining the desired high magnification. Surface roughness invites field emission and sparking from the curved surface. Therefore, a high degree of surface smoothness is required so as not to distort the reflected image. This is especially important in the present type of microscope because of its high sensitivity.

Assuming the walls and the boundaries of the microscope are so far from the curved surface that hence their influence may be disregarded, and considering the paraxial rays only, the magnification M of such a curved mirror microscope under these conditions would be $$M = \frac{2D}{R}$$

D being the distance between the ball and the viewing screen and R being the radius of the curved surface. For example, if D=1.00 cm. and R=.1 mm., the result would be a magnification M=20,000. Actual magnification will in general be smaller due to aperture lens effects.

It will be appreciated that the curved surface of the mirror must be rather small to provide high magnification and that the sphericity should be uniform if uniform magnification is desired. To obtain ball mirrors which meet these requirements, thin metal wires are melted in a vacuum, or in an inert atmosphere. In forming the ball mirrors it is presently preferred to use metals of great hardness, high melting points and high surface tension which are not too much affected by matter with which they may come into contact. Good results have been obtained with the use of tungsten wire formed into balls by electron bombardment melting. Other metals including the noble metals, such as gold, silver, or platinum, and suitable non-metals, such as glass and quartz, may also be found useful. When insulating materials, such as glass, which has proved particularly satisfactory, are used the surface should be provided with a conductive layer.

The anode voltage of the housing 10 may vary between a few thousand and one hundred K volts.

It has been found beneficial in the practice of the invention to employ the aperture and wall arrangement 16, 17. The ball 15 placed in the axis of the aperture 16 may be either in front of the aperture, level with or inside of it. The aperture may also have an anode potential. Such apertures are useful to vary the magnification and to provide higher illumination density. Easier adjustment of the illuminating beam may be achieved if part of the inside of the aperture is coated with a suitable fluorescent material, as shown at 21.

From the foregoing, it will be appreciated that this invention permits simplification of electron mirror microscopes by reason of the fact that magnetic and electronic lens systems are not required. Moreover, the voltage supply is simplified, since only one high voltage potential is required and no severe requirements exist with respect to ripple and stability because in the practice of this invention magnification is not dependent on the voltage.

This invention requires the use of mirror-specimens or specimen supports having excellent surface conditions. Fortunately, however, in manufacturing the very small ball mirrors a smoothness of surface, suitable for use in the practice of this invention, is formed by the surface tension of material which surface is superior to a surface which could be obtained by polishing.

It will be appreciated that this invention is advantageous because it permits a high magnification in a simplified electron microscope. Previous designs of mirror electron microscopes although convenient because they did not require deflecting magnetic fields were severally restricted in their ultimate magnification, for the magnification had to be accomplished in one electron optical stage located close to the mirror object. In this invention, the mirror object surface effects the magnification means as well as serving as the electron reflecting means.

It will be appreciated that the foregoing disclosure is for purposes of illustrating the invention and in accordance with the applicable statutes the presently preferred form of the invention is described. However, it will be understood that the invention is not to be limited to the description but that the invention may be carried out by other means which do not constitute departures from the scope of the invention, the scope of the invention being defined by the following claims.

What is claimed:

1. An electron mirror microscope comprising an electron gun, a curved reflecting and magnifying mirror-specimen, and a luminescent screen through which said electron gun projects, said electron gun, mirro-specimen and luminescent screen means being arranged whereby electrons emitted by the electron gun will travel to and be reflected by the mirror-specimen onto the luminescent screen means to produce a magnified image.

2. An electron mirror microscope system comprising an electron gun, a convex spherical reflecting and magnifying mirro-specimen for reflecting electrons emitted by said gun, and a luminescent screen through which said electron gun projects for receiving a magnified reflected image.

3. An electron mirror microscope comprising an electron gun for emitting a beam of electrons, a curved reflecting magnifying mirror-specimen having a slight negative bias with respect to the electron gun cathode whereby the potential surfaces in front of the mirror-specimen affect the electrons and reflect them, and a luminescent viewing screen through which said electron gun projects, which receives the reflected electrons and provides an enlarged pictorial representation of the potential distribution in front of the mirror-specimen.

4. An electron mirror microscope comprising a housing having an anode potential with a voltage of a few thousand to 100K volts, a luminescent screen at one end of said housing having an opening defined therein, an electron cathode gun positioned for emitting electrons through said opening, a curved electron mirror-specimen spaced from the end of the housing, said specimen being slightly negative with respect to the cathode for repelling the low-velocity electrons emitted by the electron gun and for reflecting the electrons back onto the luminescent screen to produce a magnified image.

5. An electron mirror microscope comprising a housing having an anode potential, a luminescent screen at one end of said housing, an electron gun extending through said luminescent screen for emitting electrons from that end of the housing, a wall spaced from said one end of the housing having an aperture defined in said wall, and a curved electron mirror-specimen disposed in said aperture, said curved mirror-specimen being adapted to repel electrons emitted by said electron gun and said screen being adapted to receive the enlarged reflected image.

6. The apparatus of claim 5 wherein the portions of the wall defining the aperture are coated as a fluorescent screen.

7. An electron mirror microscope comprising an electron gun for emitting a beam of electrons, a curved reflecting magnifying mirror-specimen spaced from said electron gun adapted for reflecting the electrons emitted by said gun, and a luminescent screen through which said electron gun projects, for receiving the reflected and magnified electron images, said curved reflecting magnifying mirror-specimen comprising a spherical reflecting surface having a diameter $10^2$ to $10^4$ times smaller than the distance between the curved surface and the screen.

8. An electron mirror microscope comprising, an electron gun, a ball mirror-specimen having a uniformly smooth surface and having a curvature of uniform radius formed by the surface tension of the material of the ball when it solidified from the molten state, and a luminescent screen through which said electron gun projects, the electron gun, mirror-specimen and screen being arranged with respect to each other so that electrons emitted by the electron gun will travel to and be reflected by the mirror-specimen onto the luminescent screen means to produce a magnified image.

References Cited in the file of this patent

UNITED STATES PATENTS

| | | |
|---|---|---|
| 2,502,146 | Grivet | Mar. 28, 1950 |
| 2,614,223 | Ramberg | Oct. 14, 1952 |
| 2,901,627 | Wiskott et al. | Aug. 25, 1959 |

UNITED STATES PATENT OFFICE
CERTIFICATE OF CORRECTION

Patent No. 3,047,719                                            July 31, 1962

Ludwig J. Mayer

It is hereby certified that error appears in the above numbered patent requiring correction and that the said Letters Patent should read as corrected below.

Column 1, line 44, for "electrode" read -- electron --.

Signed and sealed this 8th day of January, 1963.

(SEAL)
Attest:

ERNEST W. SWIDER
Attesting Officer

DAVID L. LADD
Commissioner of Patents